3,020,390
LIGHT PROJECTOR
Carroll B. Lusk, Richmond, Va.
(101 Forrest Way, Camillus, N.Y.)
Filed June 17, 1958, Ser. No. 742,536
3 Claims. (Cl. 240—3)

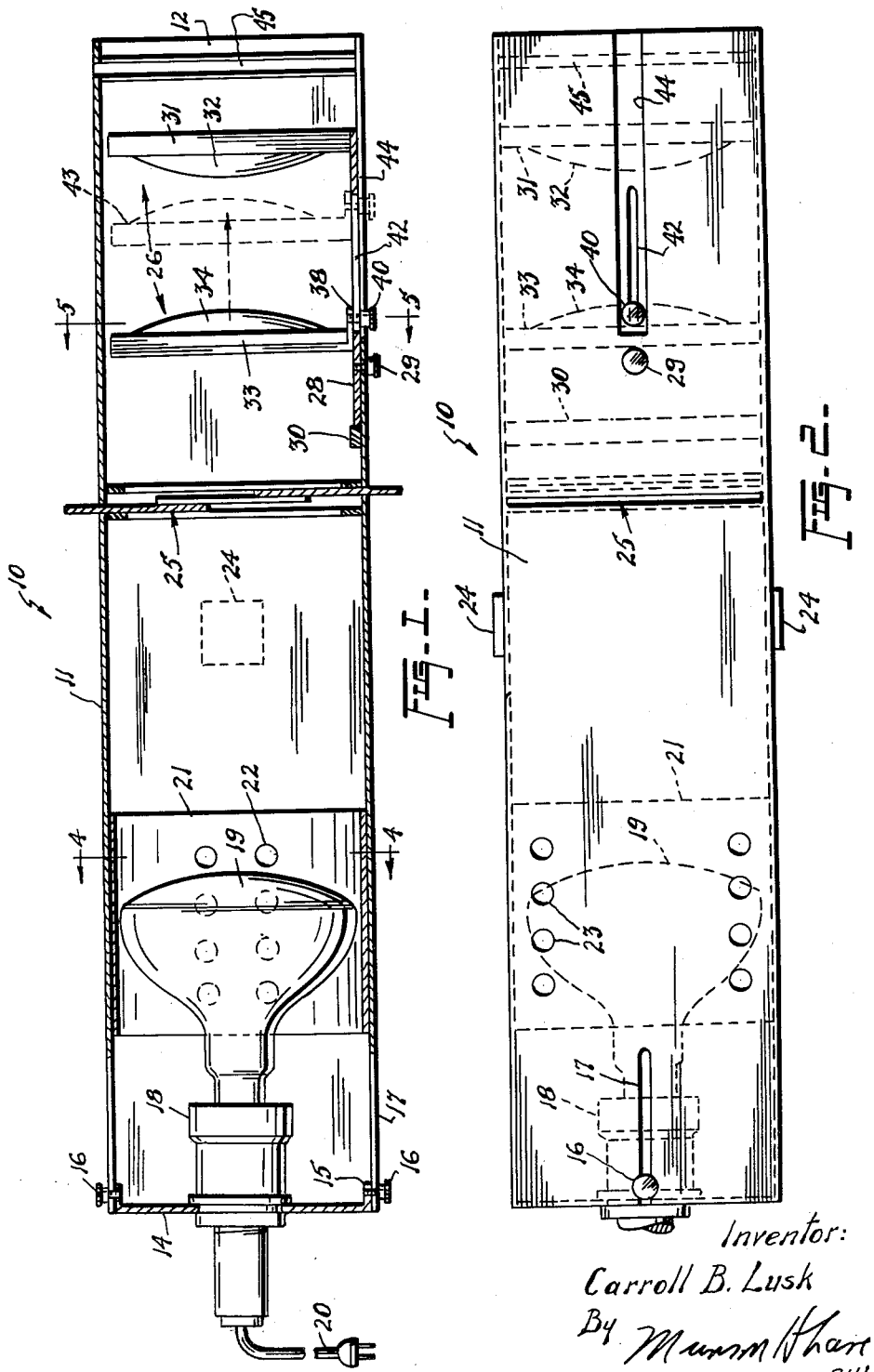

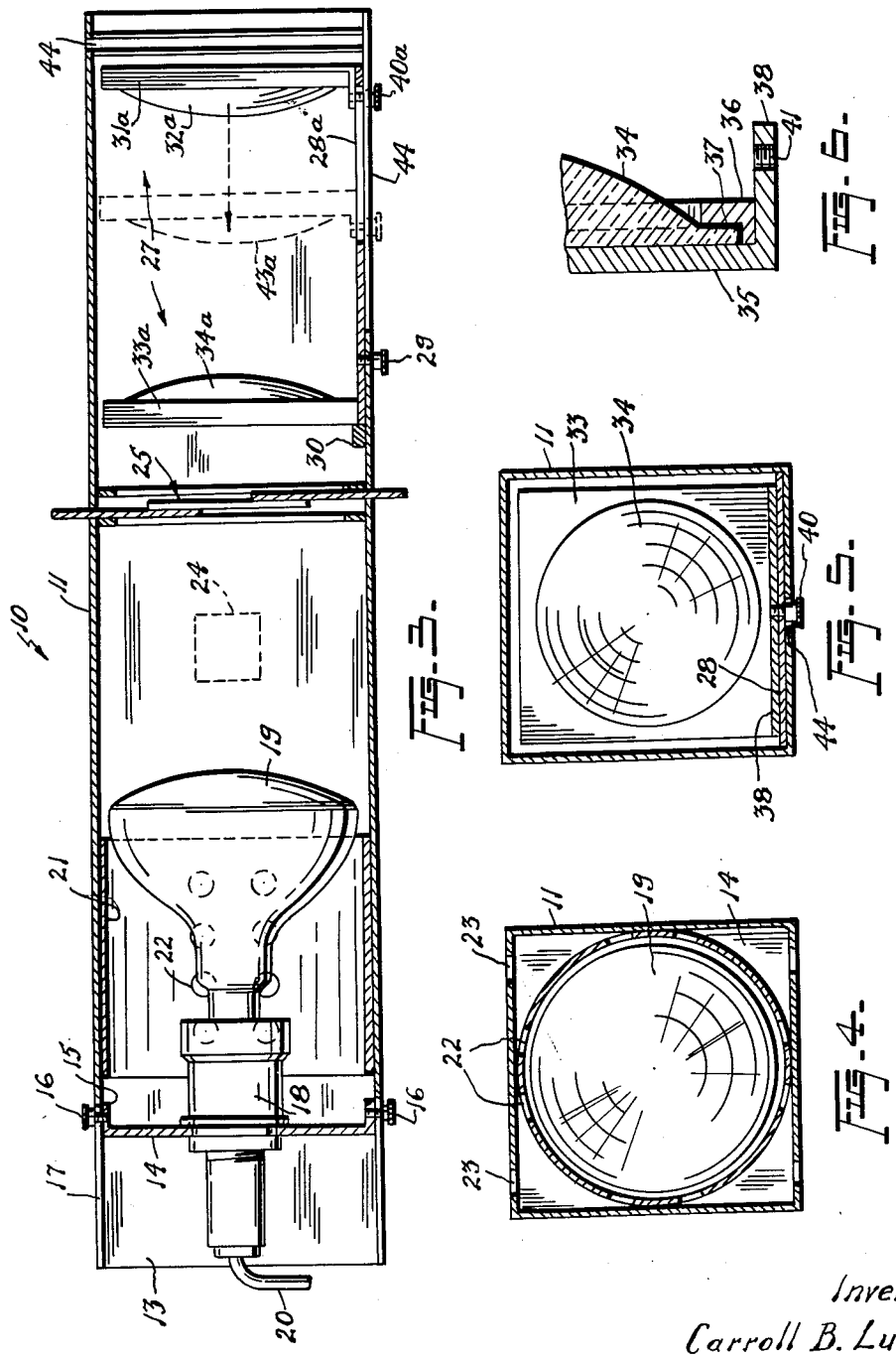

This invention relates to new and useful improvements in light projectors such as spotlights, floodlights and similar other lights such as may be used for illuminating works of art, commercial products and other items on display, and the principal object of the invention is to provide a light projector of this nature which may be quickly and easily adjusted both as to the width of the light beam and as to the hardness or softness of the beam projected thereby.

Briefly, the invention contemplates the provision of a projector which includes an elongated housing having a source of light in one end portion thereof and a lens unit in its other end portion, the lens unit including a pair of lenses, one of which is movable toward and away from the other to permit an adjustment of the softness or hardness of the light beam.

Also, the invention contemplates the provision of two separate lens units, namely, a relatively wide beam lens unit and a relatively narrow beam lens unit, which are positionable selectively and individually in the housing, while means are also provided for adjusting the position of the source of light longitudinally in the housing, that is, toward or away from the particular lens unit which is being used, thus permitting either a wide or a narrow beam to be projected, as desired.

Other features of the invention involve the provision of a shutter mechanism between the lens unit and the light source, as well as facilities for use of color filters, when required.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIGURE 1 is a longitudinal sectional view of the light projector in accordance with the invention, the same being taken in a vertical plane and showing an arrangement of parts as used for projection of a relatively narrow light beam;

FIGURE 2 is an underside plan view thereof;

FIGURE 3 is a longitudinal sectional view, similar to that shown in FIGURE 1 but illustrating an arrangement of parts for use in projecting a relatively wide beam;

FIGURE 4 is a cross-sectional view, taken substantially in the plane of the line 4—4 in FIGURE 1;

FIGURE 5 is a cross-sectional view, taken substantially in the plane of the line 5—5 in FIGURE 1; and FIGURE 6 is a fragmentary sectional detail on an enlarged scale, showing the mounting of one of the lenses in its frame.

Referring now to the accompanying drawings in detail, the light projector in accordance with the invention is designated generally by the reference numeral 10 and embodies in its construction an elongated housing 11 which is preferably rectangular in cross-section and has open front and rear ends 12, 13, respectively.

A substantially rectangular back plate 14 is longitudinally slidably positioned in the rear end portion of the housing, being provided at its upper and lower edges with flanges 15 to receive clamping screws 16 which project through longitudinal slots 17 with which the upper and lower walls of the housing are formed. It will be apparent from the foregoing that the back plate 14 may be positioned either at the end of the housing as shown in FIGURE 1 or in a plane spaced inwardly from the end of the housing as shown in FIGURE 3, and locked in either position by simply tightening the screws 16.

The back plate 14 carries at the center thereof a suitable conventional socket 18 for a suitable lamp 19, the socket having an extension cord 20 connected thereto for delivering electric current to the lamp.

A tubular baffle 21 is secured in any suitable manner in the housing and surrounds the lamp 19 as shown, the baffle being provided with sets of air openings or apertures 22 and the portion of the housing having the baffle therein also being provided with similar apertures 23, to permit dissipation of heat from the lamp to the exterior of the housing. For the same purpose, additional apertures (not shown) may be provided in the back plate 14. The slots 17 are open-ended, whereby the entire back plate and lamp unit may be removed from the housing for purposes of replacement or cleaning of the lamp.

The intermediate portion of the housing 11 is provided at opposite sides thereof with mounting plates 24 whereby the entire projector may be suspended or otherwise supported in any suitable manner from a convenient supporting structure (not shown). Moreover, the intermediate portion of the housing is equipped with a suitable shutter mechanism 25 for shutting off the light beam and/or controlling the output of the lamp 19. This shutter mechanism is of any suitable conventional construction, for example, such as is disclosed in Patent No. 1,738,945 issued on December 10, 1929; it being understood, of course, that any other suitable mechanism may be employed.

The front end portion of the housing 11 is adapted to selectively and individually receive either of two lens units, namely, a narrow beam lens unit 26 shown in FIGURE 1, or a wide beam lens unit 27 shown in FIGURE 3. Although these two units are similar in construction, their specific arrangement is slightly different and both will be described.

The relatively narrow beam lens unit 26 comprises a supporting plate 28 which is removably positioned on the bottom of the front end portion of the housing and is retained in position by a suitable screw 29. When the plate 28 is inserted in the housing, the inner edge of the plate abuts a stop bar 30 which is secured to the bottom housing wall, as will be clearly apparent.

A lens mounting frame 31 is rigidly secured to the front end of the plate 28 and carries a suitable lens 32, while a similar frame 33 is adjustably attached to the plate 28 for movement toward and away from the frame 31 and carries a second lens 34. By virtue of this arrangement, the distance between the lenses 32, 34 may be varied so as to correspondingly vary the hardness or softness of the light beam which is transmitted through the lens unit from the lamp 19. As is best shown in FIGURE 6, the frame 33 consists of two complemental parts 35, 36 which are suitably secured together so as to clamp a marginal flange 37 of the lens 34 therebetween, and the frame portion 35 is provided at its lower edge with a flange 38 to receive a suitable clamping screw 40 in a screw-threaded aperture 41 with which the flange is formed.

The screw 40 is slidable in a longitudinal slot 42 formed in the supporting plate 28, it being apparent from the foregoing that by simply loosening the screw 41, the frame 33 with the associated lens 34 may be slid from the position shown by the full lines in FIGURE 1 to that shown by the dotted lines 43, and vice versa.

The lower wall of the housing is provided with an open-ended slot 44 which affords sufficient clearance for sliding of the screw 40 with the frame 33 and also permits the entire lens unit 26 to be slidably removed from the housing, for purposes of replacement by the lens unit 27.

The arrangement of the frame 32 and lens 31 is substantially the same as already described in connection with the frame 33 and lens 34, with exception that the frame 31 is rigidly secured, in any suitable manner, to the supporting plate 28, rather than being adjustably mounted thereon, as is the frame 33.

The relatively wide beam lens unit 27, like the unit 26, consists of a supporting plate 28a which, as is shown in FIGURE 3, carries a rigidly mounted frame 31a with a lens 32a, and an adjustably mounted frame 33a with a lens 34a. However, in this instance the arrangement is reversed so that while in the unit 26 the frame 31 is relatively stationary and the frame 33 is relatively movable, in the unit 27 the frame 33a is relatively stationary and the frame 31a is relatively movable.

The movable frame 31a may be locked in a set position on the plate 28a by a screw 40a, the loosening of which permits the frame 31a and the associated lens 32a to be shifted toward the frame 33a as indicated at 43a, and vice versa.

The front end portion of the housing 11 is also equipped, in advance or forwardly of the lens unit with a slotted guide 45 to receive a suitable color filter (not shown), as is customary in the art.

When the invention is placed in use, employing either one of the lens units 26, 27, the softness or hardness of the light beam may be varied by moving the adjustable lens toward or away from the relatively stationary lens of the lens unit, as will be clearly understood.

Moreover, the width of the projected beam may be varied by simply substituting the lens unit 26 for the lens unit 27, and vice versa, the optical characteristics of the two lens units being such that the unit 26 projects a relatively narrow beam while the unit 27 projects a relatively wide beam, this being in conjunction with a selective positioning of the lamp 19 together with the associated back plate 14. Thus, when a relatively narrow angle of projection is desired and the narrow beam unit 26 is used, the back plate 14 is set as shown in FIGURE 1, that is, relatively remote from the lens unit.

Alternatively, when projection of a relatively wide beam is to be had, the lens unit 27 is used and the back plate 14 is set relatively closer to the lens unit, as illustrated in FIGURE 3. In either instance, the hardness or softness of the light beam may be varied by an adjustment of the distance between the two lenses of the respective lens units, as already explained.

It will be apparent from the foregoing that the light projector in accordance with the invention is very simple in construction, easy to operate, convenient to adjust, and adaptable to economical manufacture.

While in the foregoing there has been shown and described the preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

What is claimed as new is:

1. In a light projector, the combination of an elongated housing having open front and rear ends and provided in its front and rear end portions with longitudinally extending slots, a back plate provided in the rear end portion of said housing for movement forwardly and rearwardly therein, a set screw provided on said back plate and extending through the slot in the rear end portion of the housing for locking the back plate in an adjusted position, a forwardly oriented lamp carried by the back plate in the housing, and a lens unit provided in the front end portion of the housing, said lens unit including a supporting plate removably mounted in the front end portion of the housing and provided with a slot in register with the slot in said front end portion, a fixed lens provided on said supporting plate, a movable lens frame positioned on the supporting plate for movement toward and away from the fixed lens, a lens in said movable frame, and a set screw provided in the movable frame and extending through the slot in said supporting plate for locking the movable frame in an adjusted position, said last mentioned screw being slidable in and accessible through the slot in the front end portion of said housing.

2. In a light projector, the combination of an elongated housing having a rear end and an open front end and provided in its front and rear end portions with longitudinally extending slots, a back plate provided in the rear end portion of said housing for movement forwardly and rearwardly therein, fastening means for said back plate extending through the slot in the rear end portion of the housing for locking the back plate in an adjusted position, a forwardly oriented lamp carried by the back plate in the housing, and a lens unit provided in the front end portion of the housing, said lens unit including a supporting plate removably mounted in the front end portion of the housing and provided with a slot in register with the slot in said front end portion, a fixed lens provided on said supporting plate, a movable lens frame positioned on the supporting plate for movement toward and away from the fixed lens, a lens in said movable frame, and fastening means provided on the movable frame and extending through the slot in said supporting plate for locking the movable frame in an adjusted position, said last mentioned fastening means being accessible through the slot in the front end portion of the housing.

3. In a light projector, the combination of an elongated housing having a rear end and an open front end and provided in its front end portion with a longitudinally extending slot, a forwardly oriented lamp provided in the rear end portion of said housing, and a lens unit provided in the front end portion of the housing, said lens unit including a supporting plate removably mounted in the front end portion of the housing and provided with a slot in register with the slot in said front end portion, a fixed lens provided on said supporting plate, a movable lens frame positioned on the supporting plate for movement toward and away from the fixed lens, a lens in said movable frame, and fastening means provided on the movable frame and extending through the slot in said supporting plate for locking the movable frame in an adjusted position, said fastening means being accessible through the slot in the front end portion of the housing.

References Cited in the file of this patent
UNITED STATES PATENTS

| | | |
|---|---|---|
| 996,662 | Myers | July 4, 1911 |
| 1,215,171 | Lewis | Feb. 6, 1917 |
| 1,235,484 | Jones | July 31, 1917 |
| 1,270,269 | Davis | June 25, 1918 |
| 1,695,556 | McGunnigle | Dec. 18, 1928 |
| 1,884,265 | Rush | Oct. 25, 1932 |
| 2,080,120 | Everett | May 11, 1937 |
| 2,085,732 | Baxter | July 6, 1937 |
| 2,347,771 | Dion et al. | May 2, 1944 |